United States Patent [19]
Menegoli et al.

[11] Patent Number: 5,883,479
[45] Date of Patent: Mar. 16, 1999

[54] BEMF RECTIFICATION DURING POWER OFF TO PREVENT PARASITIC EFFECT

[75] Inventors: Paolo Menegoli, Milpitas; Gianluca Colli, Santa Clara, both of Calif.

[73] Assignee: STMicroelectronics, Inc., Carrollton, Tex.

[21] Appl. No.: 886,324

[22] Filed: Jul. 1, 1997

[51] Int. Cl.[6] ...................................................... H02P 6/02
[52] U.S. Cl. ........................ 318/254; 318/138; 318/439; 318/245
[58] Field of Search ..................................... 318/138, 245, 318/25, 439, 432, 433, 771, 770, 779

[56] References Cited

U.S. PATENT DOCUMENTS

| | | | |
|---|---|---|---|
| 4,987,352 | 1/1991 | Ishii | 318/254 |
| 5,191,269 | 3/1993 | Carobolante | 318/254 |
| 5,374,857 | 12/1994 | Carobolante | 327/110 |
| 5,589,744 | 12/1996 | Brambilla | 318/254 |
| 5,656,897 | 8/1997 | Carobolante et al. | 318/254 |
| 5,661,382 | 8/1997 | Schlager et al. | 318/439 |

*Primary Examiner*—Paul Ip
*Attorney, Agent, or Firm*—Richard A. Bachand; Theodore E. Galanthay; Lisa K. Jorgenson

[57] ABSTRACT

A circuit and method to clamp a node of a power device connected to a driving node of a polyphase d-c motor to a reference potential during a powering off of the drive includes a current mirror and a comparator. A first input of the comparator is connected to the reference potential, and a second input is connected to the driving node. The reference potential may be a ground potential, or, preferably, the potential at another driving node of the motor. An output of the comparator is connected to a first side of the current mirror. A circuit is connected to apply a current reflecting the output of the comparator to a low side driver connected to the node.

11 Claims, 6 Drawing Sheets

5,883,479

BEMF RECTIFICATION DURING POWER OFF TO PREVENT PARASITIC EFFECT

BACKGROUND OF THE INVENTION

1. Field of the Invention

This invention relates to improvements in circuits and methods for operating polyphase d-c motors and the like, and more particularly to improvements in circuits and methods for preventing parasitic effects on a polyphase d-c motor as it is being powered down.

2. Relevant Background

Polyphase d-c motors have wide applications. For example, one of many areas in which polyphase d-c motors are widely used is in the spinning or rotating of disk drives in personal computer (PC) environments. The disk is spun by the polyphase d-c motor at a relatively precise period of rotation. Typically, a PC disk drive, which may be internal or external to the computer, has a magnetic medium on a disk or platter. One or more magnetic heads are selectively moved radially inwardly or outwardly to enable data to be written to or read from selective locations on the magnetic medium.

When power is removed from the motor, for example, on power off of the PC or on a failure of the power to the system, a complex series of events is often initiated. Such events may include, for example, the running of routines to handle any data that may be in the process of being written to the magnetic media at the time of power off, routines to physically move the magnetic heads to a parked or landing position, routines to stop the rotation of the disk rapidly to avoid excessive wear on the landed heads, and so on.

When the power is removed, typically the power is not instantaneously removed, for example, by a step or ramp function shaped wave form, but instead, is ramped down from the operating voltage to zero. In fact, usually special provisions are taken to ensure that even in a power failure situation, the power to the motor and the circuits associated with the disk drive is conditioned to fall in a known predetermined way after the system power has failed.

After the power has failed or has been removed, however, the motor, which has an inertial mass that tends to keep the motor components of the motor in motion, continues to rotate for some time, until frictional losses stop the rotation, or until the motor is deliberately braked. At some point during the falling value of power supply voltage, the back EMF (BEMF) generated by the coils of the motor begins to supply voltage to the system. The BEMF forces the drive terminals of the motor to go below ground potential. Generally, the magnitude of the voltage to which the BEMF can force the driving terminals below ground is limited by an intrinsic diode, which is a part of the driver power transistors. Typically, for example, the BEMF may swing to about 0.6 volts below ground.

This negative voltage can result in the creation of parasitic devices in and around the power device or driving transistors, or in the other integrated circuits that may be associated with the drive circuits. The parasitic devices may turn on and cause unexpected and/or undesired motor functions, voltages, or operations. Thus, what is needed is a circuit and method to prevent parasitic effects on a d-c motor as it is being powered down. Moreover, the negative voltage wastes BEMF power which otherwise could be used in performing the power-down functions, such as moving and parking the heads, or the like. What is needed, furthermore, is a circuit and method to capture additional BEMF power generated by the motor during its power-down that can be used in performing the various shut-down routines, or for other purposes.

SUMMARY OF THE INVENTION

In light of the above, therefore, it is an object of the invention to provide an improved circuit and method to capture additional BEMF power generated by the motor during its power-down that can be used in performing the various shut-down routines, or for other purposes.

It is another object of the invention to provide an improved circuit and method to prevent parasitic effects on a d-c motor as it is being powered down.

These and other objects, features and advantages of the invention will be apparent to those skilled in the art from the following detailed description, when read in conjunction with the accompanying drawings and appended claims.

Thus, according to a broad aspect of the invention, a circuit is provided to clamp a power node associated with a polyphase d-c motor to a reference potential during a powering off of the motor. The polyphase d-c motor may be a three phase polyphase motor of the type used to drive a memory disk of a computer system or the like. A monitor circuit monitors the back emf produced by the motor at each of its driving nodes to detect if the back emf at any of the nodes falls below a reference potential, which may be ground, or, preferably, the potential at another driving node of the motor, wherein the voltages at the drive nodes of the motor are compared among themselves.

A circuit operative in response to the monitor circuit detects if the back emf at any of the nodes has fallen below the reference potential, and if so, to turn on the low side driver corresponding to the node below the reference potential to hold the node at ground.

A head retract circuit may be connected to retract a disk drive head during the powering off process.

The monitor circuit may be formed of a comparator having a first input connected to a first driving node of the motor a second input connected to another of the driving nodes of the motor. Additional second inputs may be provided for additional different output nodes of the motor. An output of the comparator may be connected to a first side of a current mirror so that the circuit is operative in response to the monitor circuit detecting that any of the nodes has fallen below another to turn on a low side driver connected to a second side of the current mirror.

According to another broad aspect of the invention, a circuit is provided to clamp a node of a power device connected to a driving node of a polyphase d-c motor to a reference potential during a powering off of the drive. The circuit has a current mirror and a comparator. The comparator has a first input connected to a first motor driving node, a second input connected to another driving node, and an output connected to a first side of the current mirror. A control circuit is connected to apply mirrored current reflecting the output of the comparator to a low side driver connected to the node.

According to yet another broad aspect of the invention, a method is presented for clamping the outputs of a power device connected to driving nodes of a polyphase d-c motor to a reference potential during a powering off of the drive. The method includes monitoring the back emf produced by the motor at each of the driving nodes to detect if any of the nodes falls below a reference potential, and, in response to the circuit operative in response to the monitor circuit, detecting that any of the nodes has fallen below the reference potential, turning on a low side driver corresponding to the node below the reference potential, whereby the node is held at the reference potential by the low side driver.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

Figure 1:
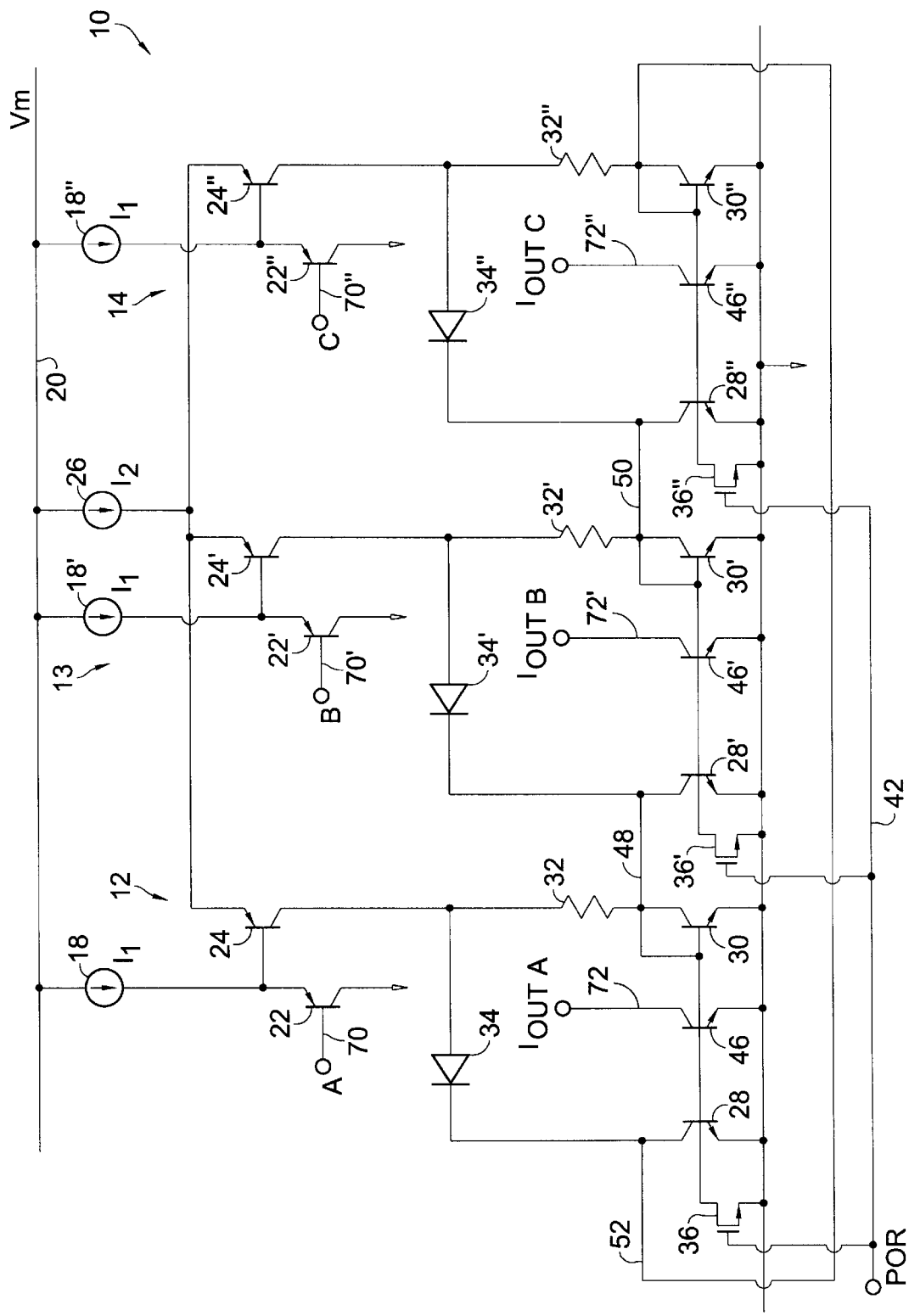
FIG. 1 is an electrical schematic diagram of a circuit that is used in conjunction with a polyphase d-c motor to reduce or prevent parasitic effects during power off of the motor and to capture additional BEMF power generated by the motor during its power-down that can be used in performing the various shut-down routines, or for other purposes, according to a preferred embodiment of the invention.

A schematic diagram of a preferred embodiment of the BEMF control circuit 10, according to the invention, is shown in FIG. 1, to which reference is now made. The BEMF control circuit 10 includes three input follower stages 12, 13, and 14, which are biased by a fixed current provided by the current source 26. Each of the input follower stages is respectively connected to the respective low-side drivers of the driver circuit for the polyphase d-c motor (not shown) at the outputs of the driver chip, which also are connected to the respective phases of the motor. The three stages 12, 13, and 14 are essentially identical, and corresponding parts of each are indicated respectively by reference numerals, followed by a prime (') and reference numerals, followed by a double prime (").

Thus, with reference now to the first input follower stage 12, a current source 18 is connected between a motor voltage supply line 20 and an emitter of a PNP transistor 22. The collector of the PNP transistor 22 is connected to ground, and the base is connected to drive node A. The emitter of the PNP transistor 22 is connected to the base of a second PNP transistor 24.

The emitter of the second PNP transistor 24 is connected to a current source, $I_2$, 26, and its collector is connected through a resistor 32 to a first side of a current mirror, which includes NPN transistor 30. The collector the PNP transistor 24 is also connected to the collector of a current ratioing transistor 28 by a diode 34. An NPN transistor 46 provides a second side of the current mirror, and has its collector connected to receive the output current from the respective stage of the driver circuit with which the input follower circuit 12 is associated. The resistor 32, the diodes 34, 34' and 34", and the NPN bipolar transistors 28, 28', and 28", prevent the bipolar transistors in the circuit of FIG. 1 from saturating.

The bases of the mirror transistors 30 and 46 and the ratioing transistor 28 are controlled by the current flowing through the mirror transistor 30. In addition, the bases of the mirror transistors 30 and 46 and the ratioing transistor 28 are connected to the drain of an NMOS transistor 36, which has its source connected to a ground or reference potential line 40. The gate of the NMOS transistor 36 is connected to a control line 42, which is connected to a power on reset signal (not shown) to initialize the transistors 30, 46, and 36.

Each input follower stage 12, 13, and 14 is connected to the next adjacent stage. In particular, the collector of the mirror transistor 30 of the first input follower stage 12 is connected to the collector of the current ratioing transistor 28' of the second input follower stage 13 by a line 48. The collector of the mirror transistor 30' of the second input follower stage 13 is connected to the collector of the current ratioing transistor 28" of the third input follower stage 14 by a line 50. Finally, the collector of the second mirror transistor 30" of the third input follower stage 14 is connected to the collector of the current ratioing transistor 28 of the first input follower stage 12 by a line 52.

As mentioned, the details of the input follower circuits 13 and 14 in the BEMF control circuit 10 of FIG. 1 are identical to the input follower 12 described above.

Figure 2:
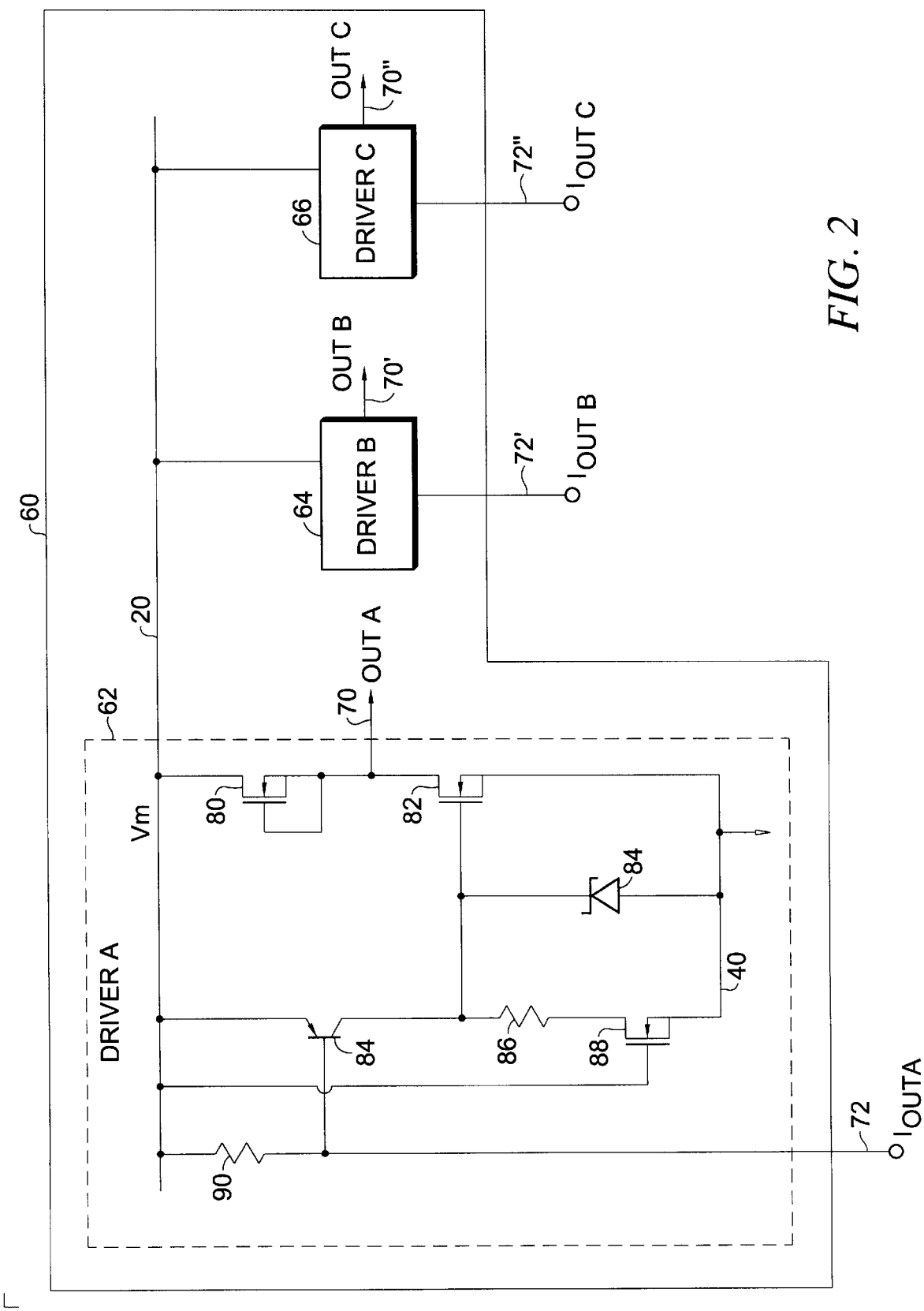
FIG. 2 is an electrical schematic and box diagram of a low-side driver portion of a motor driver circuit for a polyphase d-c motor for use in conjunction with the parasitic-reducing circuit of FIG. 1.

The relevant portions of a low-side driver circuit 60 with which the BEMF control circuit 10 in FIG. 1 may be used is shown in FIG. 2. The low-side driver circuit 60 includes three driver sections 62, 64, and 66, which are essentially identical in construction, the details of only the first section 62 being shown. Each of the sections 62, 64, and 66 has two outputs, one denoted $I_{OUTX}$, the other denoted OUTX, which are connected to the corresponding locations in the BEMF control circuit 10 of FIG. 1.

More particularly, the output, OUTA, of the first driver stage 62, is connected on line 70 to the base of the PNP transistor 22 shown in FIG. 1, and the output line $I_{OUTA}$ 72 is connected to the collector of the NPN transistor 46. The output lines 70, 70' and 70" (OUTA, OUTB, AND OUTC) are also connected to the appropriate driver terminals of the polyphase d-c motor (not shown) with which the circuit 60 is associated, in known manner.

With reference now to FIG. 2, the details of the first driver stage 62, will next be described. The driver stage 62 includes first and second MOS control transistors 80 and 82 connected between the motor voltage supply line 20 and a reference potential or ground line 40. A Zener diode 84 is connected between the ground line 40 and the gate of the MOS transistor 82. A PNP clamp transistor 84, a resistor 86, and an MOS transistor 88 are connected in series between the supply line 20 and the ground line 40. The gate of the MOS transistor 88 is connected also to the voltage supply line 20. A resistor 90 is connected from the voltage supply line 20 to the base of the PNP clamp transistor 84, and to line 72, which provides the $I_{OUTA}$ signal to the BEMF control circuit 10 of FIG. 1. As mentioned, the circuits of respective low-side drivers 64 and 66 are substantially identical to that of the low-side driver 62.

In operation, the circuit of FIG. 1 operates as a three-input comparator, monitoring the voltage on lines 70, 70' and 70", corresponding to the low-side driver output nodes A, B, and C, respectively. The voltage on the lines 70, 70' and 70" are continuously compared one to another so that when any one of the voltages on lines 70, 70' and 70" falls below another, a current is generated through the current flow path corresponding to the circuit to which the low voltage is applied. The current flow path includes respective transistors 30, 30' or 30" in the corresponding mirror circuits.

Alternatively, a four-input comparator circuit (not shown) may be employed in which each of the voltages at the output nodes are compared to a reference potential or a ground voltage, so that when any one of the voltages on lines 70, 70' and 70" falls below ground, a current is generated through the corresponding current flow path, which includes corresponding transistor 30, 30' or 30" in the respective mirror circuit.

The current flowing through one of the mirror transistors produces a current change flowing through the corresponding mirror transistor 46, 46', or 46", which in turn controls the current flowing through the collector of the respective transistors on line 72, 72' or 72". The change in current, therefore, drives the corresponding low side driver on, keeping the output voltage very close to ground, for example, within 50 mV, as can be seen in the wave form of FIG. 4, described below. Thus, in five-volt applications (such as may be encountered in popular 2½ or 3 inch disk drives) the driver circuit is enabled to gain an additional 0.7 volts of back EMF, which is very useful for accomplishing the shut-down routines necessary when power is disconnected from the motor driver circuit, as described above.

When the output of one of the power devices 80 or 82 of the low side drivers try to go below ground (and only one output per electrical phase can), all of the bias current of the respective associated stage starts to flow in the corresponding branch. This current is mirrored by the respective current mirror and sent to the corresponding low side driver via the output line 72, 72' or 72". This causes the low side power device clamp to switch the output to ground.

Figure 3:
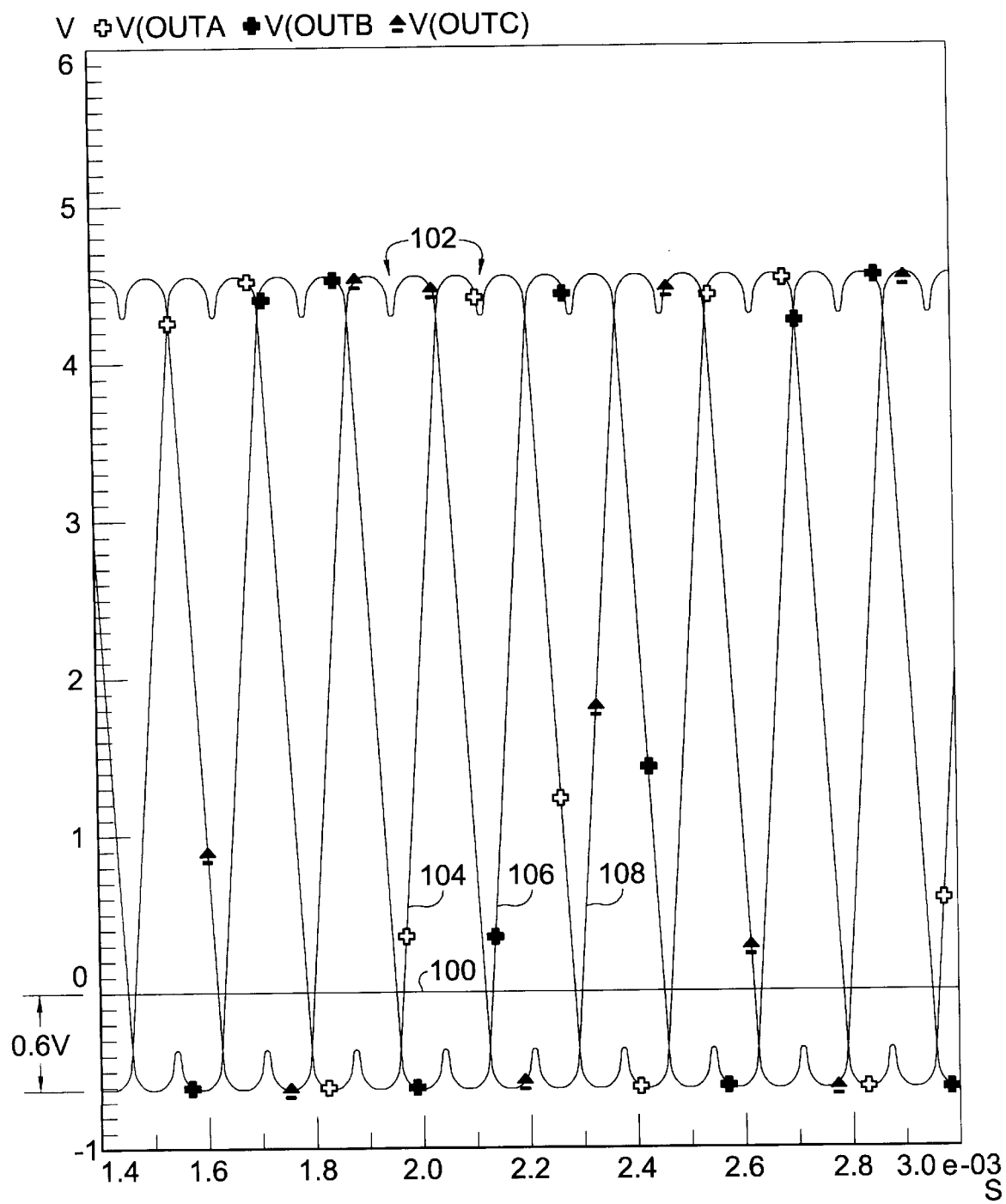
FIG. 3 is a series of superimposed voltage waveforms illustrating the voltages at the low-side driver output nodes, without using the parasitic-effect reducing circuit of FIG. 1.

Typical wave forms that are seen in the operation of a polyphase d-c motor without the use of the circuit of the invention are shown in FIG. 3. Two effects that result can be seen in first the travel of the negative-going waveforms below the ground or zero-potential line 100, for example, to a peak extent of about –0.6 volts. In addition, it is noted that a significant ripple appears at the extent of each of the voltage curves for each phase, as denoted by the reference numeral 102. In the drawing of FIG. 3, the voltage curves produced at each of the output lines OUTA(70), OUTB(70'), and OUTC(70"), are designated respectively by curve 104, curve 106, and curve 108.

Figure 4:
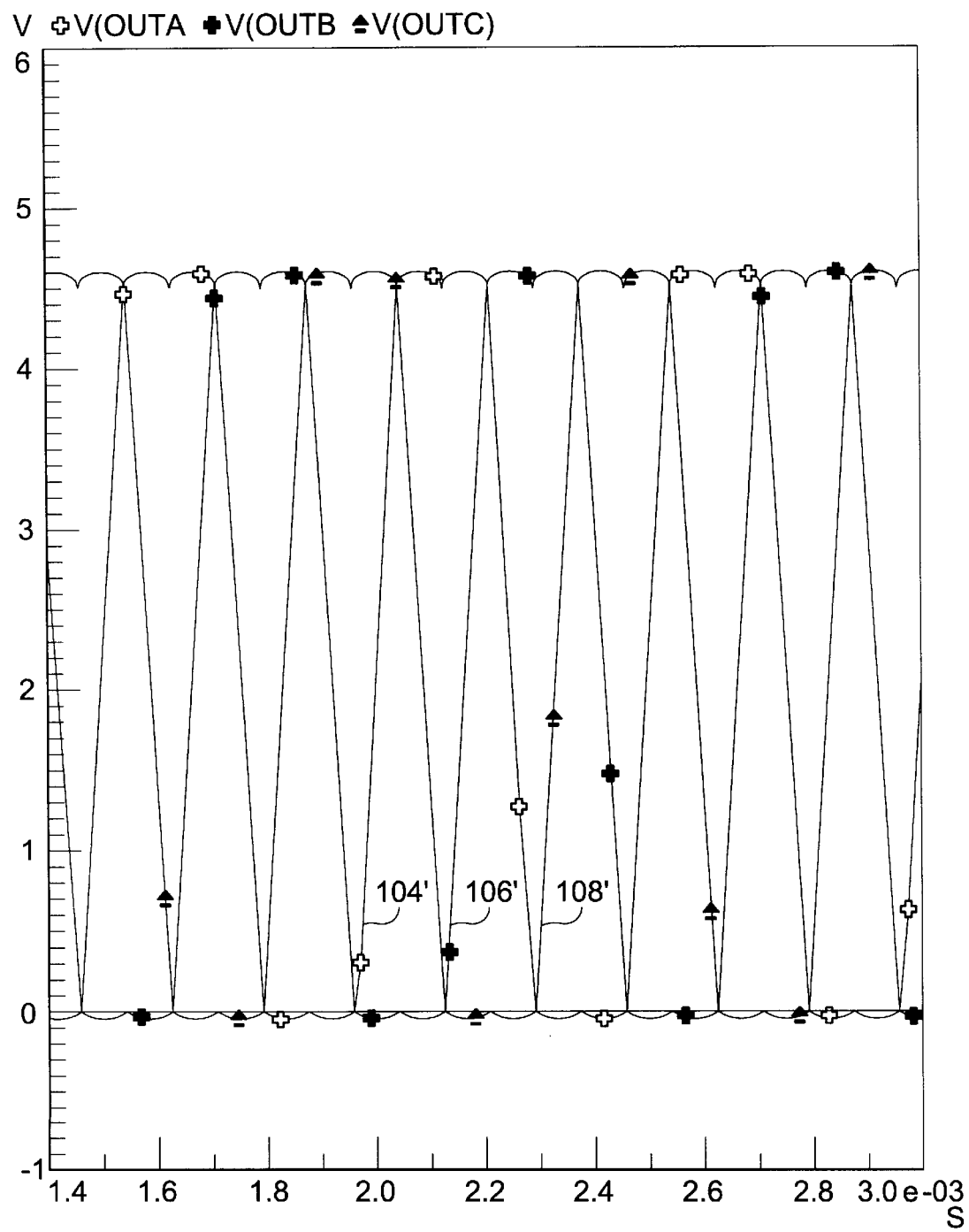
FIG. 4 is a series of superimposed voltage waveforms illustrating the voltages at the low-side driver output nodes, using the parasitic-effect reducing circuit of FIG. 1.
Figure 5A:
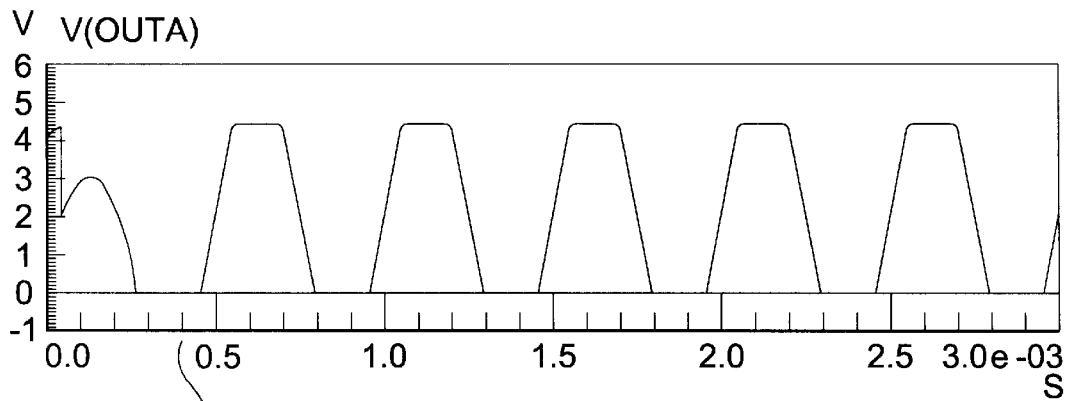
FIGS. 5A, 5C, and 5E are waveforms derived at output nodes A, C, and B, respectively of a low-side driver of a polyphase d-c motor, and FIGS. 5B, 5D, and 5F, respectively are waveforms taken at gate nodes A, C, and B in the circuit of FIG. 1 when it is employed to reduce parasitic effects in a polyphase d-c motor.
Figure 5B:
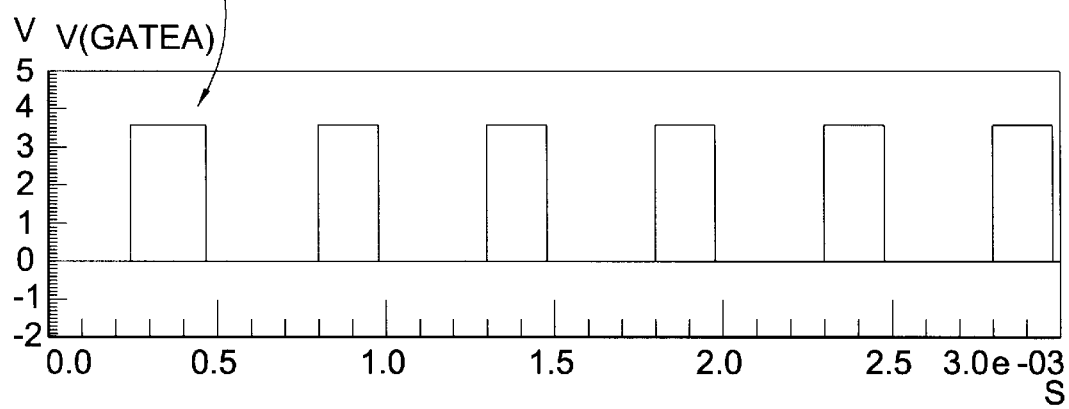
Figure 5C:
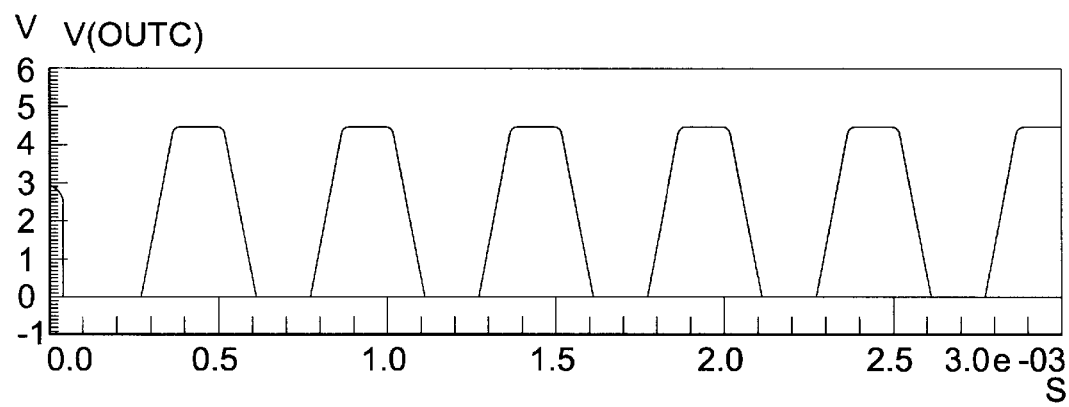
Figure 5D:
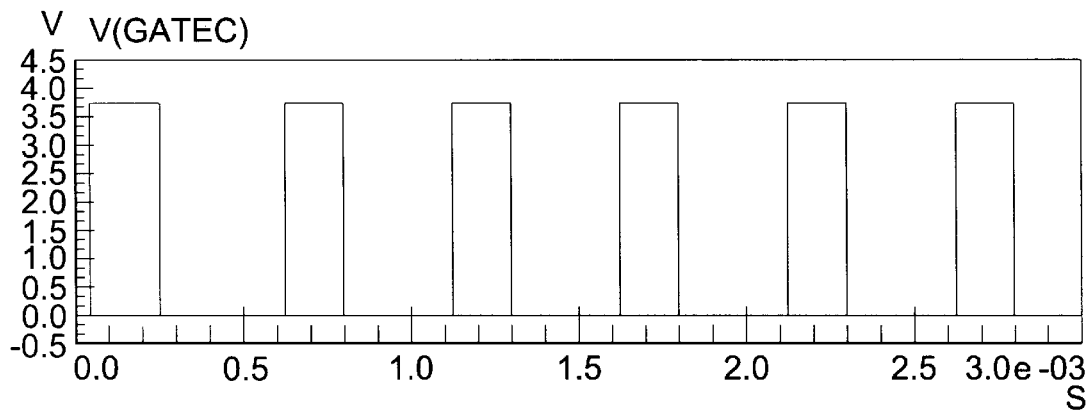
Figure 5E:
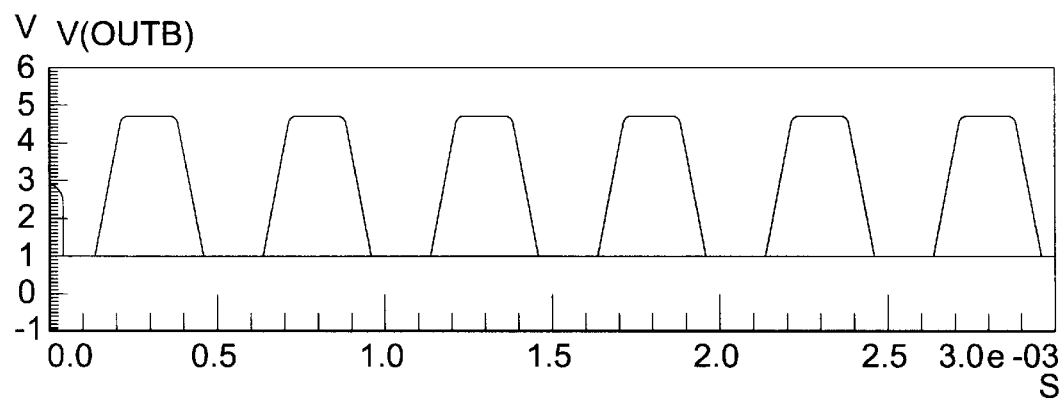
Figure 5F:
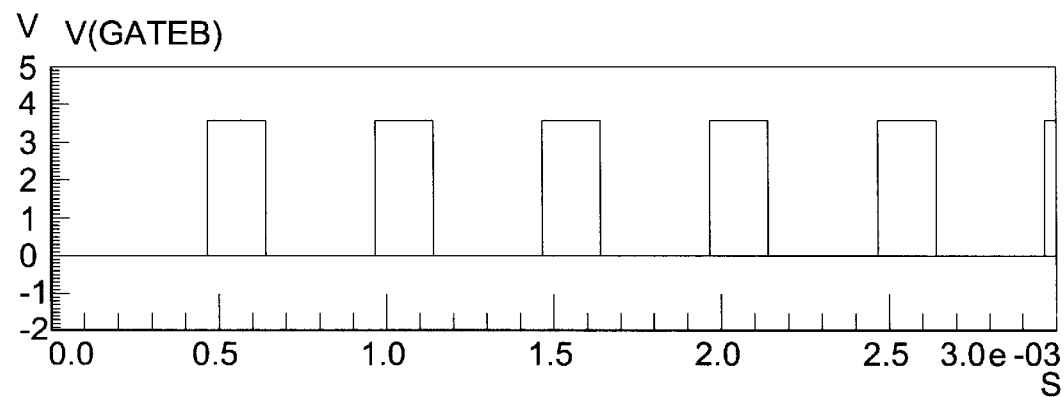

In contrast, as shown in FIG. 4, both the negative extent of the respective curves 104', 106', and 108', as well as the degree of ripple are reduced, using the BEMF control circuit 10 of FIG. 1. It can be seen that the negative extent of the curves has been substantially eliminated.

Finally, as shown in FIGS. 5A–5F, a series of wave forms are shown taken respectively at a node on the OUTA line 70, OUTC line 70", and OUTB line 70', together with the resulting gate voltages on nodes A, C and B together with the outputs taken at the respective gates of transistors 24, 24', and 24", denoted GATEA, GATEC, and GATEB in the drawing.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A circuit to clamp a power node of an associated polyphase d-c motor to a reference potential, said reference potential is a potential at another driving node of the motor, during a powering off of the motor, comprising:
    a monitor circuit for monitoring a back emf produced by the motor at each of its driving nodes for detecting if the back emf at any of said nodes falls below the reference potential;
    a circuit operative in response to said monitor circuit detecting that the back emf at any of said nodes has fallen below the reference potential, said circuit for turning on a low side driver corresponding to said node below the reference potential, whereby said node is held at the reference potential by said low side driver.

2. The circuit of claim 1 further comprising a head retract circuit connected to retract a disk drive head during powering off of the drive.

3. The circuit of claim 1 wherein said polyphase d-c motor is associated with a computer disk drive.

4. The circuit of claim 1 wherein said polyphase d-c motor is a three phase polyphase d-c motor having three driving nodes.

5. The circuit of claim 1 wherein said monitor circuit comprises a comparator having a first input connected to the reference potential and a second input connected to one of the driving nodes of said motor, said comparator having an output connected to a first side of a current mirror, and wherein said circuit operative in response to said monitor circuit detecting that any of said nodes has fallen below the reference potential for turning on a low side driver is a second side of said current mirror connected to said corresponding node.

6. A circuit to clamp a node of a power device connected to a driving node of a polyphase d-c motor to a reference potential, said reference potential is a potential at another driving node of the motor, during a powering off of the drive, comprising:
    a current mirror;
    a comparator having a first input connected to the reference potential, a second input connected to said driving node, and an output connected to a first side of said current mirror;
    a control circuit connected to apply mirrored current reflecting said output of said comparator to a low side driver connected to said node.

7. The circuit of claim 6 wherein said polyphase d-c motor is a three phase polyphase d-c motor having three driving nodes, and further comprising replicated ones of said mirror, comparator, and control circuit connected to each driving node.

8. A method for clamping the outputs of any power device connected to driving nodes of a polyphase d-c motor to a reference potential during a powering off of the drive, comprising:
    monitoring a back emf produced by the motor at each of said driving nodes to detect if any of said nodes falls below a reference potential;
    in response to said circuit operative in response to said monitor circuit detecting that any of said nodes has fallen below the reference potential, turning on a low side driver corresponding to said node below the reference potential, whereby said node is held at the reference potential by said low side driver.

9. The method of claim 8 further comprising retracting a disk drive head during a powering off of the drive.

10. The method of claim 8 wherein said monitoring step comprises comparing a reference potential with a potential of one of the driving nodes of said motor, and producing an output indicative of a result of said comparing.

11. The method of claim 10 wherein said stop of turning on a low side driver corresponding to said node below the reference potential comprises mirroring said output indicative of the result of said comparing to produce a mirrored current, and using said mirrored current to turn off said low side driver.

* * * * *